(12) United States Patent
Yoo

(10) Patent No.: US 11,854,362 B2
(45) Date of Patent: Dec. 26, 2023

(54) SYSTEM FOR TRANSMITTING AND RECEIVING SELF-POWERED POWER-FREE FIXED TEMPERATURE TYPE FIRE DETECTION

(71) Applicant: MPIA CO., LTD., Bucheon-si (KR)

(72) Inventor: Jang Yeol Yoo, Seoul (KR)

(73) Assignee: MPIA CO., LTD., Bucheon-si (KR)

( * ) Notice: Subject to any disclaimer, the term of this patent is extended or adjusted under 35 U.S.C. 154(b) by 0 days.

(21) Appl. No.: 17/797,365

(22) PCT Filed: Sep. 23, 2020

(86) PCT No.: PCT/KR2020/012843
§ 371 (c)(1),
(2) Date: Aug. 3, 2022

(87) PCT Pub. No.: WO2021/157808
PCT Pub. Date: Aug. 12, 2021

(65) Prior Publication Data
US 2023/0068271 A1  Mar. 2, 2023

(30) Foreign Application Priority Data

Feb. 3, 2020  (KR) .......................... 10-2020-0012337

(51) Int. Cl.
*G08B 17/12* (2006.01)
*G08B 25/10* (2006.01)

(52) U.S. Cl.
CPC ............ *G08B 17/12* (2013.01); *G08B 25/10* (2013.01)

(58) Field of Classification Search
CPC ........ G08B 17/12; G08B 25/10; G08B 17/06; G08B 7/06; H01H 37/00

USPC ........................................................ 340/578
See application file for complete search history.

(56) References Cited

U.S. PATENT DOCUMENTS

| | | | | |
|---|---|---|---|---|
| 6,300,871 B1 * | 10/2001 | Irwin | ..................... | G01K 1/024 374/E1.004 |
| 7,275,864 B1 * | 10/2007 | Thompson | ............. | G01K 1/024 73/146 |
| 2021/0395941 A1 * | 12/2021 | McGrane | ................ | D06F 58/30 |

FOREIGN PATENT DOCUMENTS

| | | |
|---|---|---|
| JP | 2005275844 A | 10/2005 |
| KR | 20010076054 A | 8/2001 |
| KR | 101223680 B1 | 1/2013 |
| KR | 20160061662 A | 6/2016 |

(Continued)

OTHER PUBLICATIONS

International search report of PCT/KR2020/012843, dated Jan. 13, 2021, English translation.

*Primary Examiner* — Tai T Nguyen
(74) *Attorney, Agent, or Firm* — STIP Law Group, LLC

(57) ABSTRACT

The present invention relates to a system for wirelessly transmitting and receiving self- powered power-free fixed temperature type fire detection, the system comprising: a self-powered fixed temperature type fire detector operating by the heat generated by fire occurrence and self- powered; a receiver for receiving and monitoring a fire occurrence signal through wireless communication according to the operation of the self-powered fixed temperature type fire detector; and an application part for allowing the signal received from the receiver to be notified in real time, wherein the fire detector is wirelessly installed, self-powered, and maximized in dust and water-resistant efficiencies.

7 Claims, 11 Drawing Sheets

(56) References Cited

FOREIGN PATENT DOCUMENTS

| KR | 102022644 B1 | 9/2019 |
|---|---|---|
| KR | 102152447 B1 | 9/2020 |

* cited by examiner

SYSTEM FOR TRANSMITTING AND RECEIVING SELF-POWERED POWER-FREE FIXED TEMPERATURE TYPE FIRE DETECTION

CROSS-REFERENCE TO RELATED APPLICATIONS

This application is the U.S. National Phase under 35 U.S.C. § 371 of International Application No. PCT/KR2020/012843 filed on Sep. 23, 2020, which in turn claims the benefit of Korean Application No. 10-2020-0012337 filed on Feb. 3, 2020, the disclosures of which are incorporated by reference into the present application.

TECHNICAL FIELD

The present invention relates to a system for wirelessly transmitting and receiving self-powered power-free fixed temperature type fire detection, and more specifically, to a system for wirelessly transmitting and receiving self-powered power-free fixed temperature type fire detection that is capable of allowing a fire detector to be installed wirelessly self-powered and maximized in dust and water-resistant efficiencies.

BACKGROUND ART

Generally, fire detectors are divided into heat detectors, smoke detectors, infrared light detectors, and the like according to their ways of detecting fires.

The different types of fire detectors operate electronically, and accordingly, electric energy, that is, electric power has to be supplied to them. The electric power is supplied through a power line introduced into a building, and the like, and otherwise, it is supplied independently from a separate place prepared for an impending danger, such as a monitoring station, and the like.

Further, a primary battery is mounted onto the fire detector itself and used as power for the fire detector.

If the power line introduced into the building is used, however, 110 or 220 V alternating current has to be converted into direct current, and accordingly, the fire detector has to have a rectifier. To prepare the case where a fire occurs by the power line, a charging circuit using secondary battery is built in the fire detector to thus operate the fire detector.

In this case, it is easy that the power acquisition through the use of the power line introduced from the outside is relatively convenient, but when the fire detector is installed, electricity works are additionally needed. Besides, the fire detector may not be installed at a place where the power line is not introduced.

Further, it is necessary to install the rectifier, rectifying circuit, and charging circuit for the secondary battery, thereby causing the fire detector's price to become high.

Moreover, if the power is supplied through the power line independently installed on the monitoring station, it is mainly used in a district where large-scale living facilities such as apartments, buildings, and the like are concentrated, and in this case, the power is very reliable as independent power. However, if the monitoring station is distant from the district, the power cannot be used, and when considering that the power line has a length in the range of tens to hundreds of meters, the power line may be damaged by the reasons applied from the outside, thereby failing to supply the power to the fire detector.

Further, if the primary battery is used as the power for the fire detector, the installation of the fire detector may be freely performed, irrespective of the electricity supply facilities around the fire detector, but since an electrolyte solution always comes into contact with a metal electrode in the general structure of the primary battery, if the fire detector is left for one to two years, primary battery self-discharge may occur, thereby periodically exchanging the primary cell with new one inconveniently.

DISCLOSURE

Technical Problems

Accordingly, the present invention has been made in view of the above-mentioned problems occurring in the related art, and it is an object of the present invention to provide a system for wirelessly transmitting and receiving self-powered power-free fixed temperature type fire detection that is capable of allowing a shape memory alloy spring responding to a temperature change to be adopted to detect fire occurrence and to perform self power generation, so that since there is no need to perform any wiring, a self-powered fixed temperature type fire detector can be installed conveniently, irrespective of installation places, operate through the self power generation, without having any battery, to make it possible to be used semi-permanently, and enhance dust and water-resistant efficiencies to maximize the performance of a product.

Technical Solutions

To accomplish the above-mentioned objects, according to the present invention, there is provided a system for wirelessly transmitting and receiving self-powered power-free fixed temperature type fire detection, the system including: a self-powered fixed temperature type fire detector operating by the heat generated by fire occurrence and self-powered; a receiver for receiving and monitoring a fire occurrence signal through wireless communication according to the operation of the self-powered fixed temperature type fire detector; and an application part for allowing the signal received from the receiver to be notified in real time.

The self-powered fixed temperature type fire detector may include a detecting part for detecting, if a temperature caused by the fire occurrence is above a pre-determined temperature, the temperature to thus operate, and a dust and water-resistant self-powered operating part operating cooperatively with the operation of the detecting part to transmit a fire occurrence signal to the receiver.

The detecting part may include a top cover connected to the dust and water-resistant self-powered operating part, a spring cover connected to the top cover, a push protrusion inserted into the spring cover, coming into contact with the dust and water-resistant self-powered operating part, and operating the dust and water-resistant self-powered operating part, a shape memory alloy spring disposed inside the spring cover, extended and compressed through shape memory displacement by the high temperature heat generated by the fire occurrence, and pressing the push protrusion serving as a switch to operate the dust and water-resistant self-powered operating part, and a return spring disposed inside the spring cover to return the push protrusion to the original state thereof under a situation where the shape memory alloy spring is automatically returned to the original state thereof if the temperature is returned to a normal temperature after fire extinguishment.

The top cover may include an insertion hole formed at the central portion thereof to insert the spring cover and the push protrusion thereinto and a plurality of connection pins disposed on the underside thereof to fasten the bolts thereto so that the detecting part is fixed to the dust and water-resistant self-powered operating part by means of the bolts.

The push protrusion may be configured to allow the end thereof to come into contact with the dust and water-resistant self-powered operating part and may include a support piece protruding outward from the middle periphery thereof to support the shape memory alloy spring and the return spring, independently of each other.

The spring cover may include a locking projection protruding from the bottom periphery thereof to be locked onto the inner peripheral surface of the top cover, without any escape therefrom, when the spring cover is inserted into the insertion hole of the top cover, and a plurality of through holes formed on the outer peripheral surface thereof to quickly transfer high temperature heat caused by the fire occurrence to the shape memory alloy spring.

In the case where the shape memory alloy spring is formed of an extension spring, if ambient temperature is above a pre-determined temperature set to the shape memory alloy spring, the shape memory alloy spring is extended to press the push protrusion, and if the ambient temperature becomes under the pre-determined temperature, the shape memory alloy spring is returned to the original state thereof to pressurize the return spring so that the push protrusion is returned to the original position thereof, in the case where the shape memory alloy spring is formed of a compression spring, if ambient temperature is above the pre-determined temperature, the shape memory alloy spring is compressed to pressurize the return spring to allow the push protrusion to be pressed, and if the ambient temperature becomes under the pre-determined temperature, the shape memory alloy spring is returned to the original size thereof to cause the push protrusion to be returned to the original position thereof, and in the case where the shape memory alloy spring is formed of a ring-shaped wire having wave displacement, which is used in small displacement, if ambient temperature is above the pre-determined temperature, the shape memory alloy spring is waved to cause given displacement so that the push protrusion is pressed and the return spring supports the push protrusion, and if the ambient temperature becomes under the pre-determined temperature, the shape memory alloy spring is returned to the original position thereof.

The dust and water-resistant self-powered operating part may include a base having partition walls adapted to form an accommodation portion thereon, a self power generation module disposed inside the accommodation portion and performing self power generation, a transmitting module electrically connected to top of the self power generation module, receiving the output generated from the self power generation module, and transmitting a radio signal to the receiver, a dust and water-resistant member disposed on tops of the partition walls of the base to seal the accommodation portion, and a middle cover surrounding the outer surfaces of the base and fixedly connected to the detecting part by means of bolts.

The dust and water-resistant member may include seating portions formed on the outer surfaces of the lower ends thereof to be seated onto the partition walls and a contact portion formed at the central portion thereof to be pressurized by the press operation of the push protrusion to thus allow the self power generation module to perform the self power generation.

The contact portion is corrugatedly formed so that when the push protrusion is pressed, the contact portion is pressurized to minimize the change in air pressure, to operate gently the self power generation module, and to be returned quickly to the original state thereof.

The receiver receives the operating signal of the self-powered fixed temperature type fire detector, displays a fire occurrence position number on a monitor, and transmits the fire occurrence signal to the application part through a communication module.

The application part receives the fire occurrence signal from the receiver to allow a fire occurrence situation to be notified and controlled through a speaker, a warning lamp, and a server.

A method for registering the self-powered fixed temperature type fire detector onto the receiver is carried out by means of the pressurization of the entire surface of the spring cover through which the spring cover having given flexibility is pressurized to press the push protrusion so that the dust and water-resistant self-powered operating part operates, or by means of the pressurization of the push protrusion, without any movement of the spring cover.

Advantageous Effects of the Invention

According to the present invention, as described above, the system for wirelessly transmitting and receiving self-powered power-free fixed temperature type fire detection is configured to allow the detecting part to detect the fire occurrence or ambient temperature increase to thus operate the dust and water-resistant self-powered operating part, so that the fire occurrence or ambient temperature increase can be quickly notified by the receiver and the application part, thereby minimizing the damages of people and properties, the dust and water-resistant self-powered operating part operating by the detection of the detecting part can be self-powered and have high dust and water resistances, thereby ensuring simple installation, preventing the introduction of dust and water perfectly, and maximizing the performance of the product.

Figure 1:
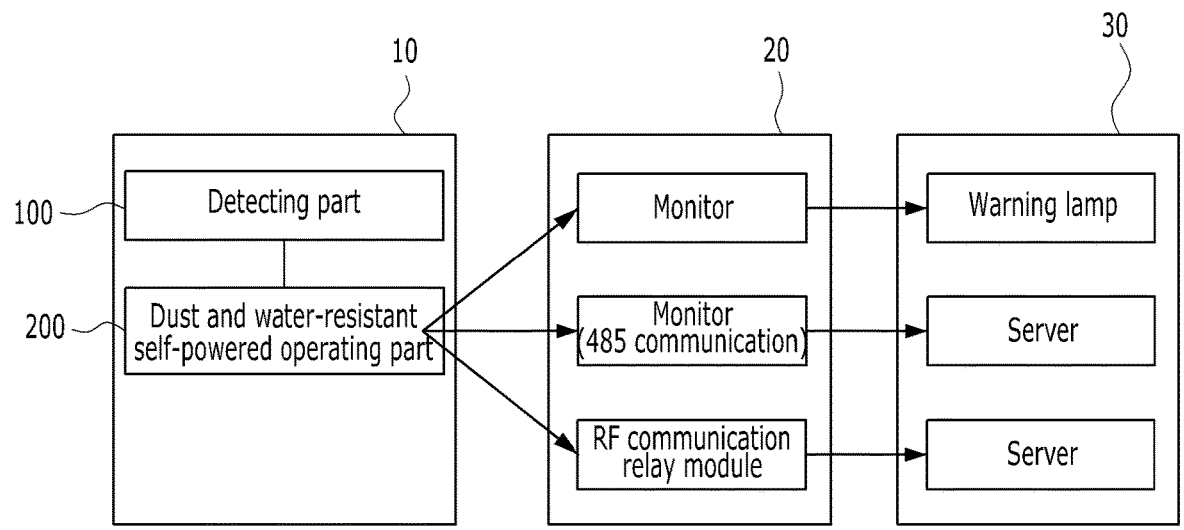
FIG. 1 is a block diagram showing a system for wirelessly transmitting and receiving self-powered power-free fixed temperature type fire detection according to the present invention.

<Explanations of Reference Numerals in the Drawings>

| | |
|---|---|
| 10: Self-powered fixed temperature type fire detector | 20: Receiver |
| 30: Application part | 100: Detecting part |
| 110: Top cover | 111: Insertion hole |
| 112: Connection piece | 120: Spring cover |
| 121: Locking projection | 122: Through hole |
| 123: Hole | 130: Push protrusion |
| 131: Support piece | 140: Shape memory alloy spring |
| 150: Return spring | 200: Dust and water-resistant self-powered operating part |
| 210: Base | 211: Accommodation portion |
| 212: Partition wall | 212a: Concave surface |
| 213: Fixing hook | 214: Rubber guide |
| 220: Self power generation module | 230: Transmitting module |
| 240: Dust and water-resistant member | 241: Seating portion |
| 241a: Convex surface | 242: Contact portion |
| 250: Middle cover | 251: Fitting hole |
| B: Bolt | T: Taper |

MODE FOR INVENTION

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

In the description, the thicknesses of the lines or the sizes of the components shown in the drawing may be magnified for the clarity and convenience of the description. Further, the terms as will be discussed later are defined in accordance with the functions of the present invention, but may be varied under the intention or regulation of a user or operator. Therefore, they should be defined on the basis of the whole scope of the present invention.

In the description, a term 'and/or' includes a combination of a plurality of relevant and described items or any one of a plurality of related and described items. The term 'coupled' or 'connected', as used herein, is defined as connected, although not necessarily directly, and not necessarily mechanically. To the contrarily, the term 'directly coupled' or 'directly connected', as used herein, is defined as connected without having any component disposed therebetween. An expression referencing a singular value additionally refers to a corresponding expression of the plural number, unless explicitly limited otherwise by the context. In this application, terms, such as "comprise", "include", or 'have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

In the description, when it is said that one member such as a layer (film), an area, a patter, or a structure is located "on" or "under" another member such as a substrate, a layer (film), an area, a pad, or pattern, it means that one member may come into contact with another member as well as yet another member may exist between the two members. References in position for the respective layers will be explained with reference to the attached drawings.

Hereinafter, an embodiment of the present invention will be described with reference to the accompanying drawings.

Figure 2:
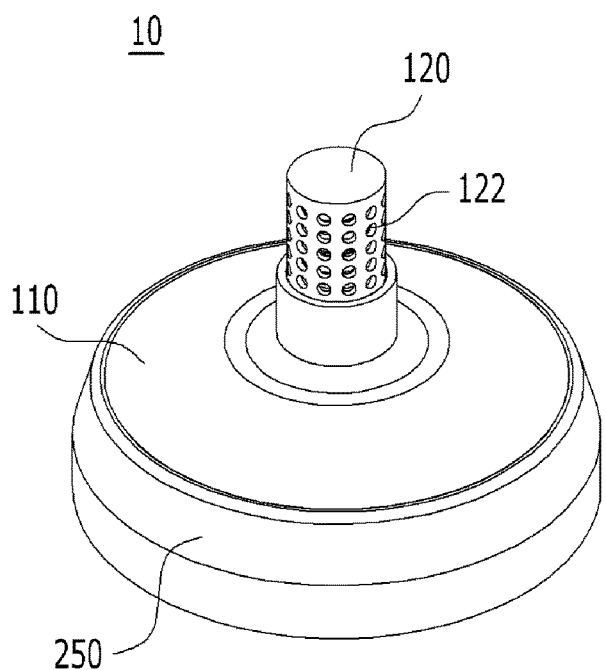
FIG. 2 is a perspective view showing a self-powered fixed temperature type fire detector of the system for wirelessly transmitting and receiving self-powered power-free fixed temperature type fire detection according to the present invention.
Figure 3:
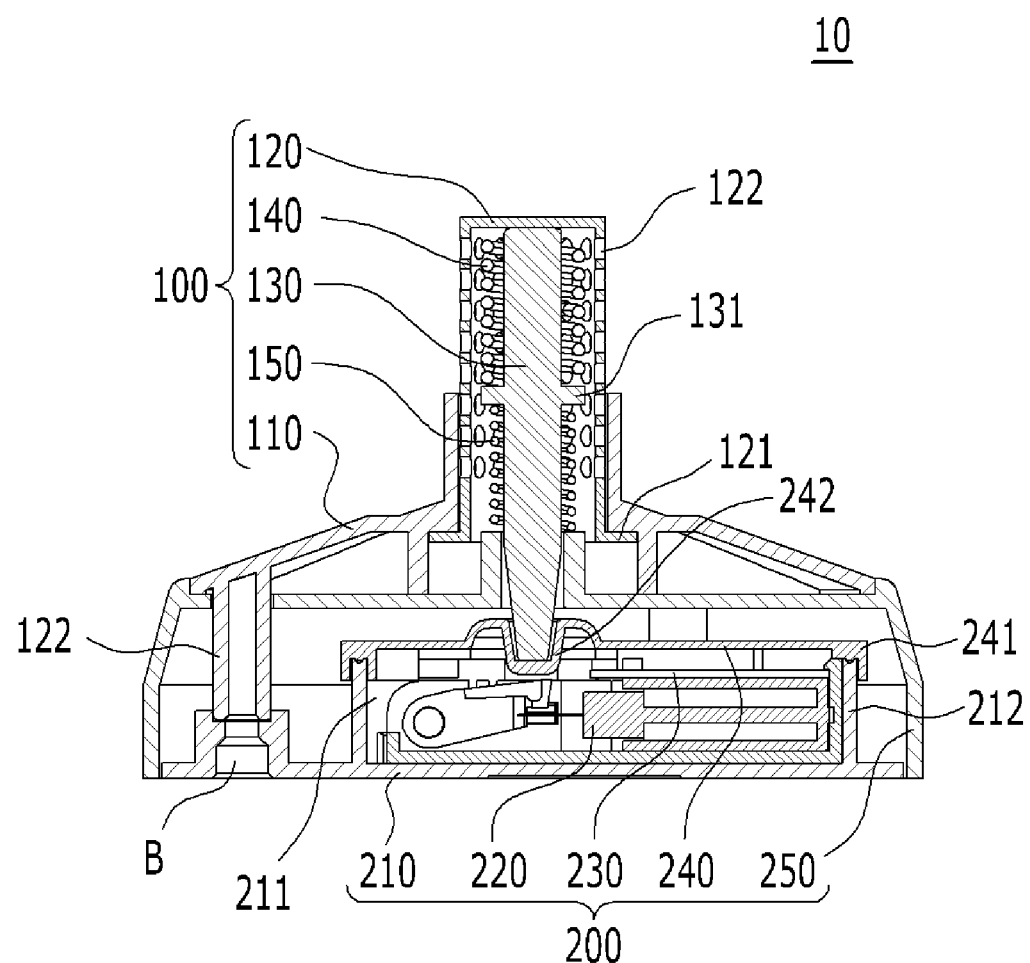
FIG. 3 is a sectional view showing the self-powered fixed temperature type fire detector of the system for wirelessly transmitting and receiving self-powered power-free fixed temperature type fire detection according to the present invention.
Figure 4:
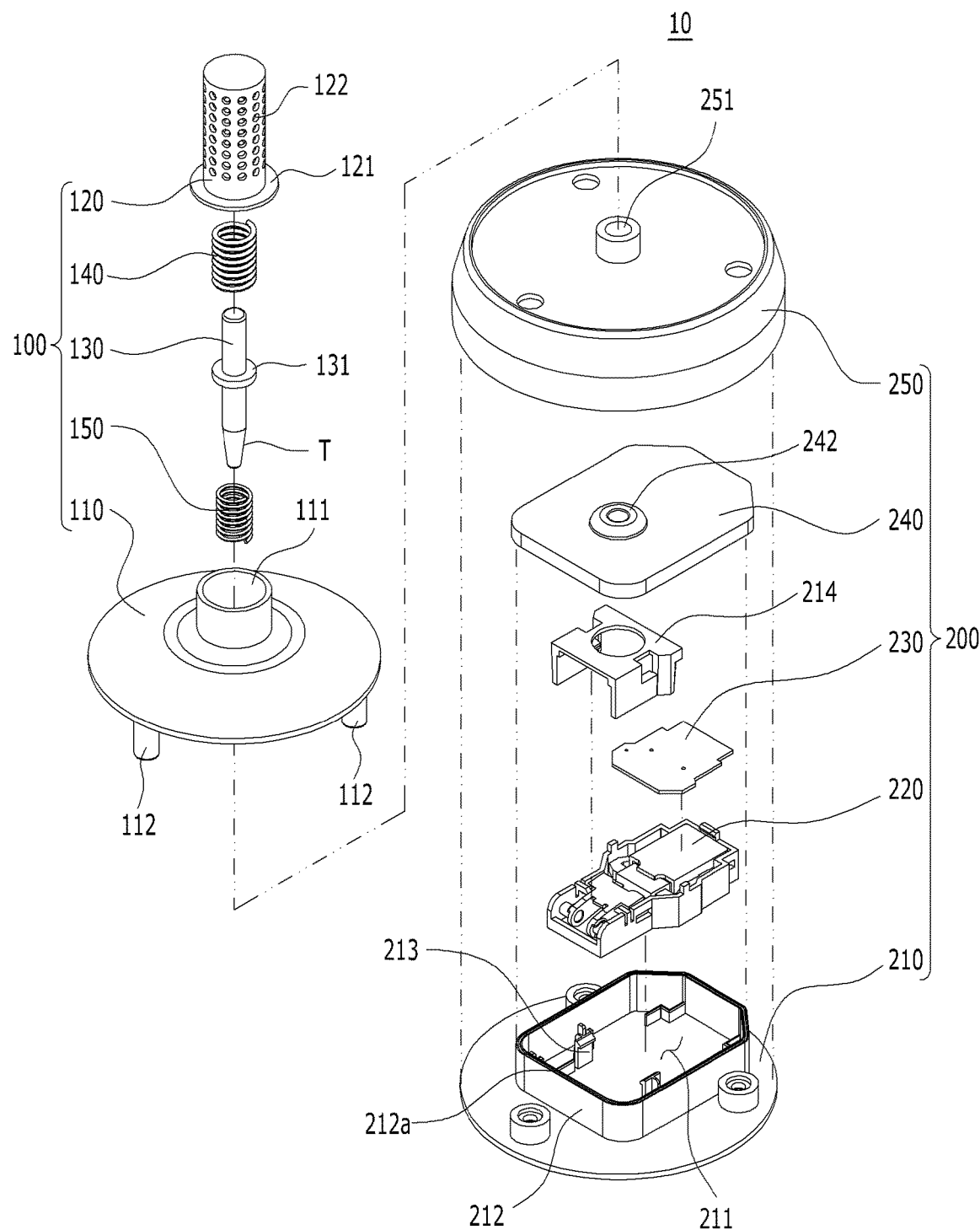
FIG. 4 is an exploded perspective view showing the self-powered fixed temperature type fire detector of the system for wirelessly transmitting and receiving self-powered power-free fixed temperature type fire detection according to the present invention.
Figure 5:
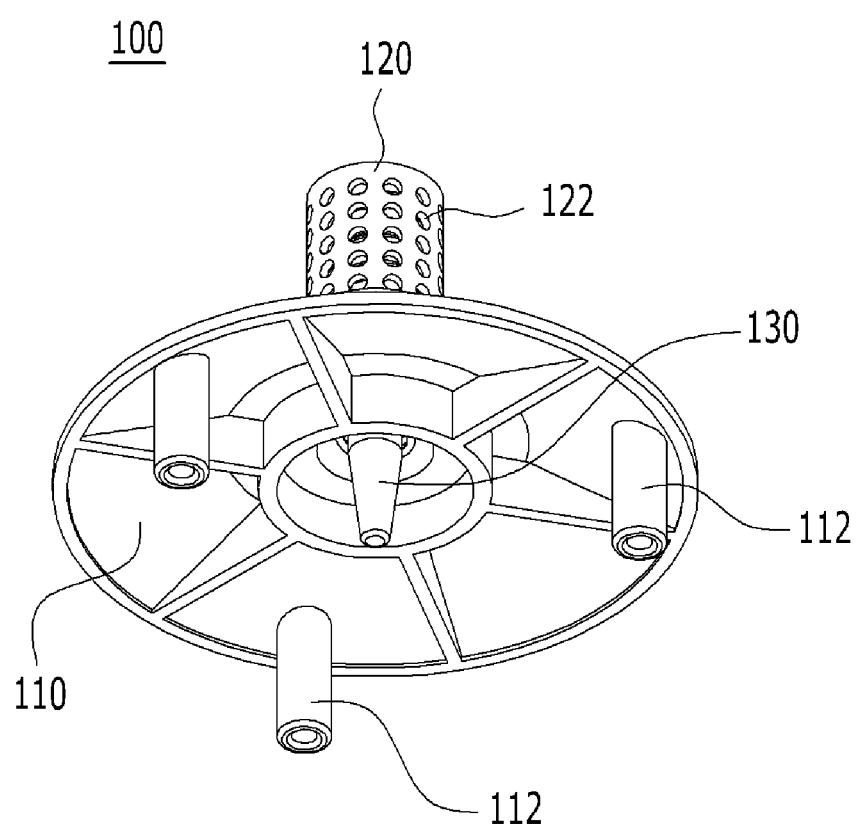
FIG. 5 is a bottom perspective view showing a detecting part of the self-powered fixed temperature type fire detector according to the present invention.
Figure 6:
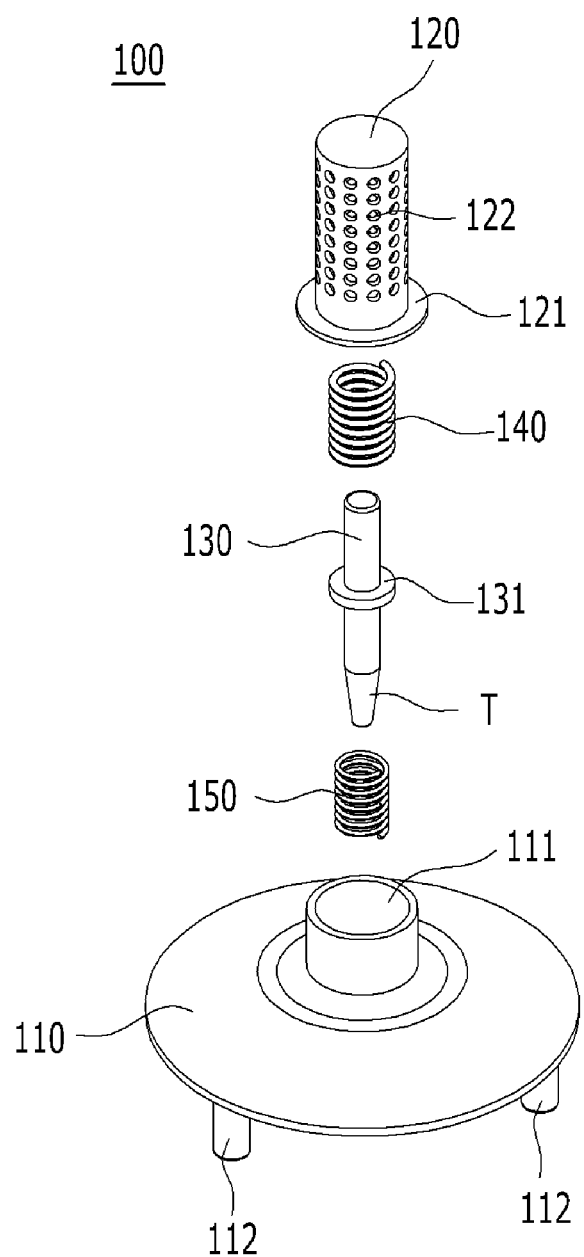
FIG. 6 is an exploded perspective view showing the detecting part of the self-powered fixed temperature type fire detector according to the present invention.
Figure 7:
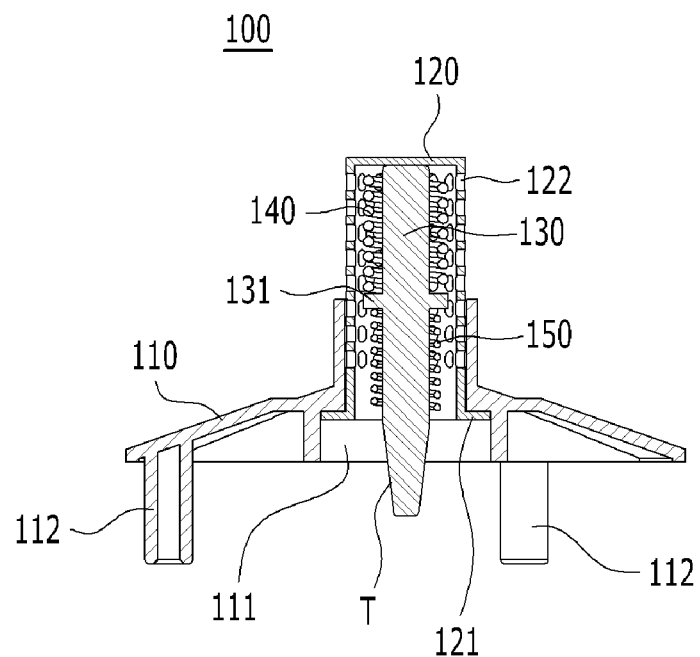
FIG. 7 is a sectional view showing the detecting part of the self-powered fixed temperature type fire detector according to the present invention.
Figure 8:
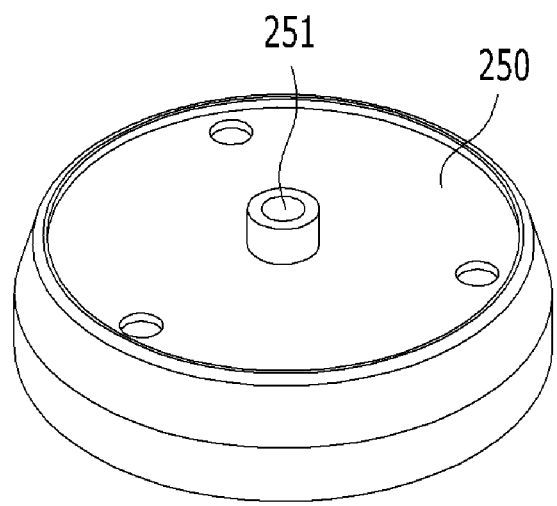
FIG. 8 is a perspective view showing a dust and water-resistant self-powered operating part of the self-powered fixed temperature type fire detector according to the present invention.
Figure 9:
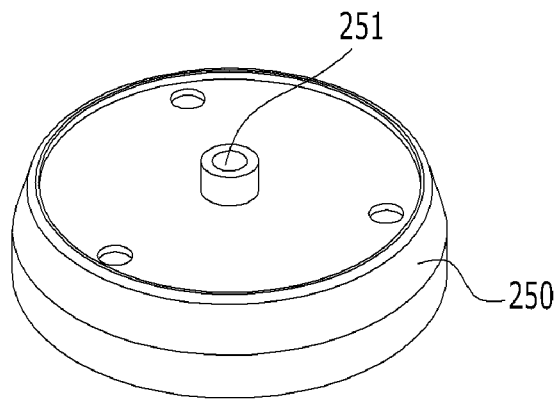
FIG. 9 is an exploded perspective view showing the dust and water-resistant self-powered operating part of the self-powered fixed temperature type fire detector according to the present invention.
Figure 9:
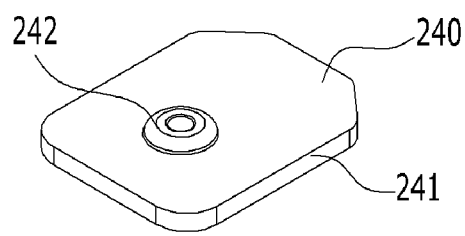
Figure 9:
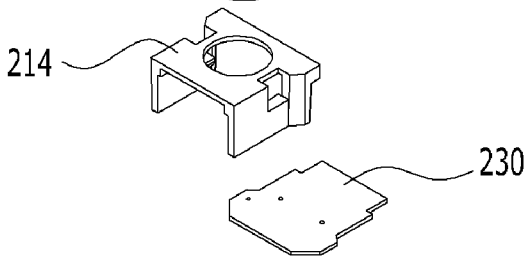
Figure 9:
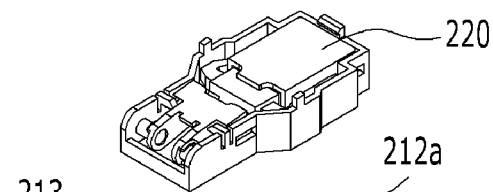
Figure 9:
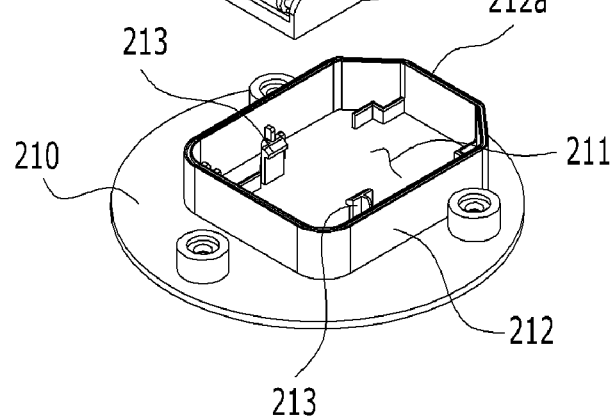
Figure 10:
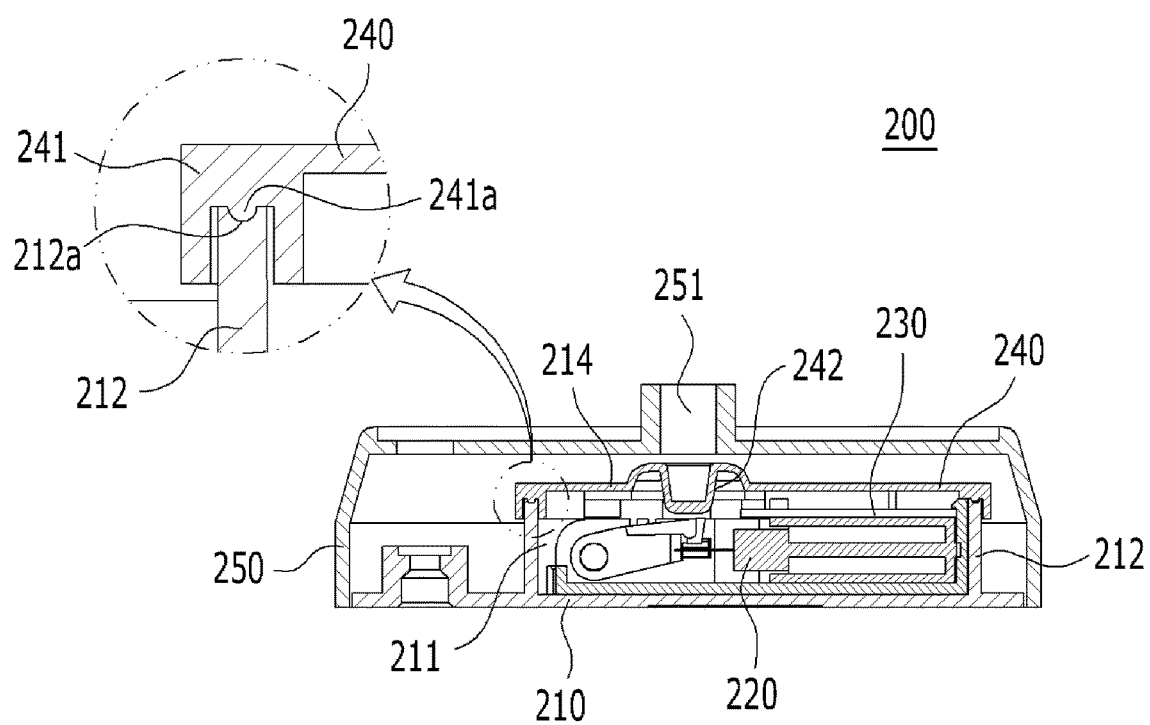
FIG. 10 is a sectional view showing the dust and water-resistant self-powered operating part of the self-powered fixed temperature type fire detector according to the present invention.
Figure 11A:
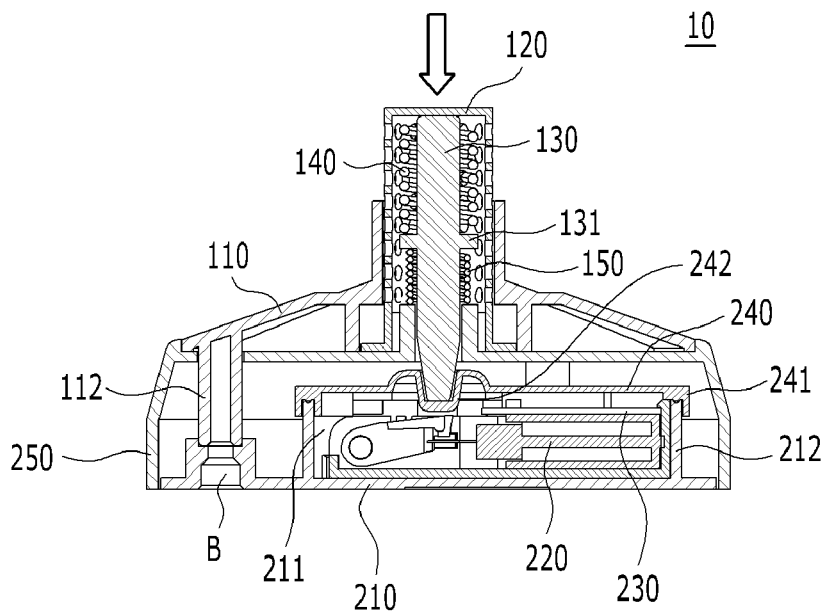
FIGS. 11a and 11b are sectional views showing a method for registering the self-powered fixed temperature type fire detector onto a receiver according to the present invention.
Figure 11B:
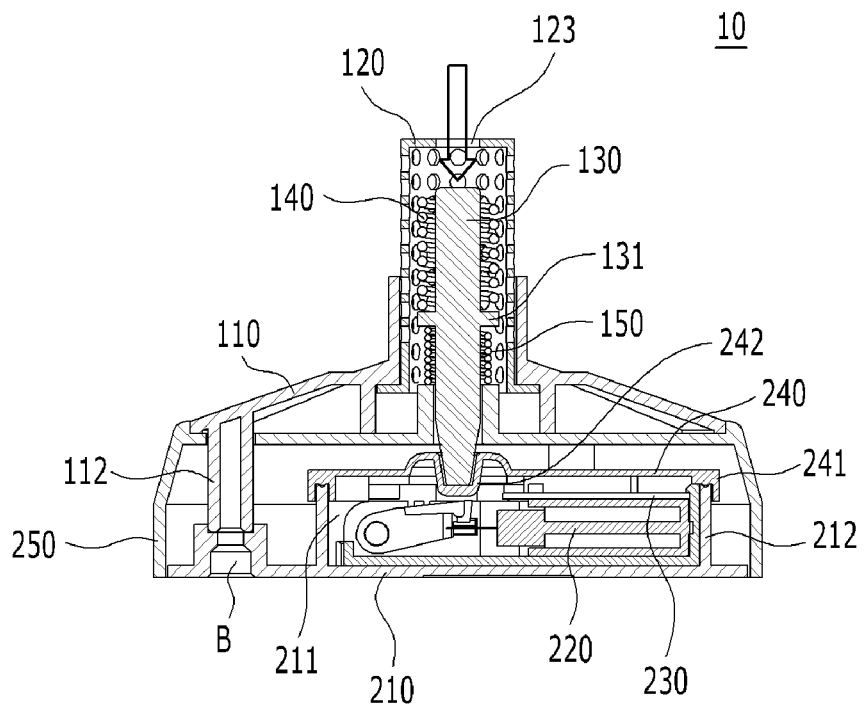
Figure 12A:
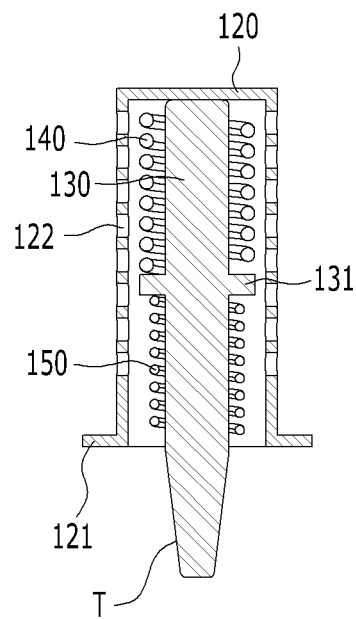
FIG. 12a, FIG. 12b and FIG. 12c are sectional views showing examples of a shape memory alloy spring adopted in the present invention.
Figure 12B:
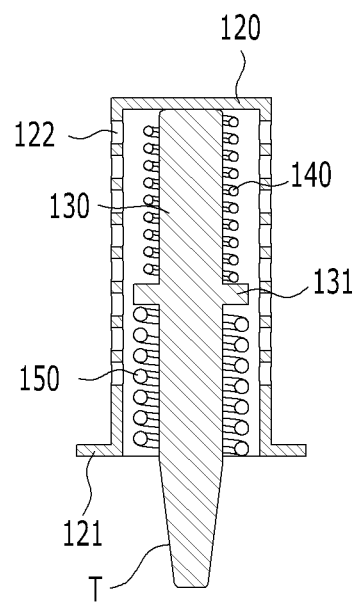
Figure 12C:
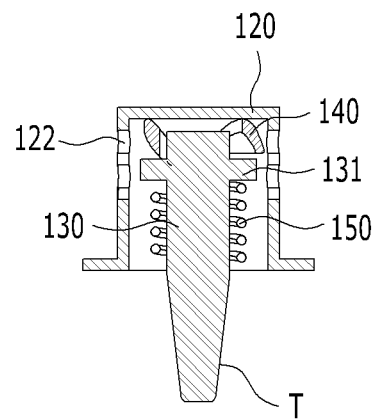
Figure 13:
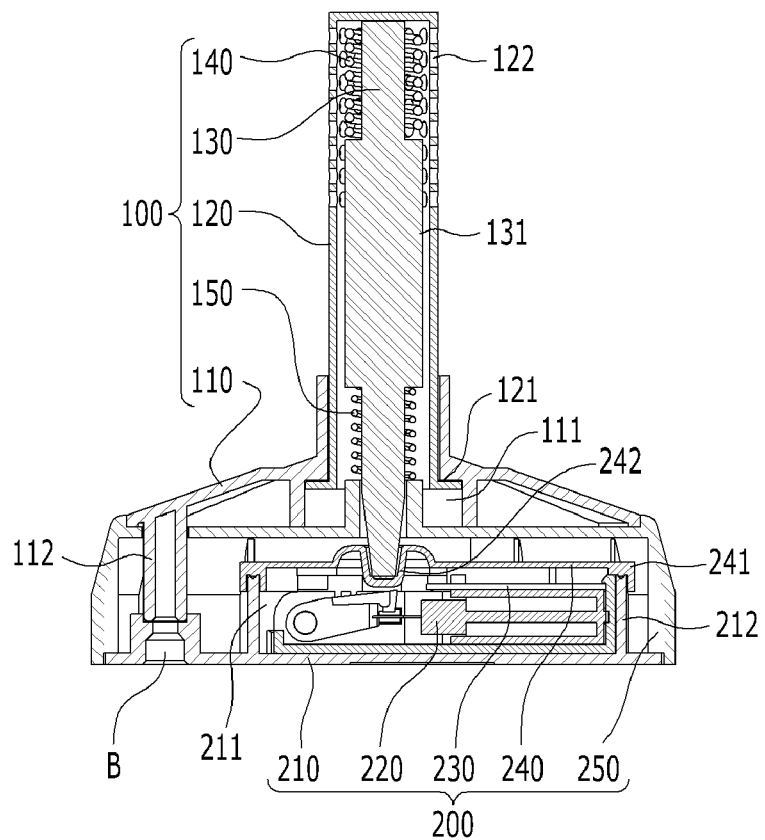
FIG. 13 is a sectional view showing another example of the self-powered fixed temperature type fire detector according to the present invention.

FIG. 1 is a block diagram showing a system for wirelessly transmitting and receiving self-powered power-free fixed temperature type fire detection according to the present invention, FIG. 2 is a perspective view showing a self-powered fixed temperature type fire detector of the system for wirelessly transmitting and receiving self-powered power-free fixed temperature type fire detection according to the present invention, FIG. 3 is a sectional view showing the self-powered fixed temperature type fire detector of the system for wirelessly transmitting and receiving self-powered power-free fixed temperature type fire detection according to the present invention, FIG. 4 is an exploded perspective view showing the self-powered fixed temperature type fire detector of the system for wirelessly transmitting and receiving self-powered power-free fixed temperature type fire detection according to the present invention, FIG. 5 is a bottom perspective view showing a detecting part of the self-powered fixed temperature type fire detector according to the present invention, FIG. 6 is an exploded perspective view showing the detecting part of the self-powered fixed temperature type fire detector according to the present invention, FIG. 7 is a sectional view showing the detecting part of the self-powered fixed temperature type fire detector according to the present invention, FIG. 8 is a perspective view showing a dust and water-resistant self-powered operating part of the self-powered fixed temperature type fire detector according to the present invention, FIG. 9 is an exploded perspective view showing the dust and water-resistant self-powered operating part of the self-powered fixed temperature type fire detector according to the present invention, FIG. 10 is a sectional view showing the dust and water-resistant self-powered operating part of the self-powered fixed temperature type fire detector according to the present invention, FIGS. 11a and 11b are sectional views showing a method for registering the self-powered fixed temperature type fire detector onto a receiver according to the present invention, FIGS. 12a to 12c are sectional views showing examples of a shape memory alloy spring adopted in the present invention, and FIG. 13 is a sectional view showing another example of the self-powered fixed temperature type fire detector according to the present invention.

As shown in FIGS. 1 to 13, a system for wirelessly transmitting and receiving self-powered power-free fixed temperature type fire detection according to the present invention includes a self-powered fixed temperature type fire detector 10, a receiver 20, and an application part 30.

The self-powered fixed temperature type fire detector 10 is disposed on the inside or outside of a building and operates by high temperature heat generated by fire occurrence or ambient temperature increase to thus detect fires.

Further, the self-powered fixed temperature type fire detector 10 is self-powered so that no wiring is needed, thereby being conveniently installed on a desired place, and further, it may be detachably mounted on the desired place, thereby changing the installation position freely.

Moreover, the self-powered fixed temperature type fire detector 10 is up-converted into radio frequency (RF) signals so that it can perform wireless communication with the receiver 20.

As shown in FIGS. 2 to 4, the self-powered fixed temperature type fire detector 10 includes a detecting part 100 and a dust and water-resistant self-powered operating part 200.

If a fire occurs to cause ambient temperature to be above a pre-determined temperature, the detecting part 100 detects the temperature change and thus operates.

That is, the detecting part 100 responds to the temperature change to operate the dust and water-resistant self-powered operating part 200, and the dust and water-resistant self-powered operating part 200 notifies the receiver 20 about a fire occurrence situation.

Further, the detecting part 100 may have an actuator using shape memory alloy (SMA).

As shown in FIGS. 4 to 7, the detecting part 100 includes a top cover 110, a spring cover 120, a push protrusion 130, a shape memory alloy spring 140, and a return spring 150.

The top cover 110 is connected to the dust and water-resistant self-powered operating part 200.

The top cover 110 has an insertion hole 111 pierced up and down at the central portion thereof to insert the spring cover 120 and the push protrusion 130 thereinto.

Further, the top cover 110 has a plurality of connection pins 112 disposed on the underside thereof to fasten bolts B thereto so that the detecting part 100 can be fixed to the dust and water-resistant self-powered operating part 200 by means of the bolts B.

Through the plurality of connection pins 112, accordingly, the detecting part 100 and the dust and water-resistant self-powered operating part 200 can be stably connected to each other, without shaking.

The spring cover 120 is connectedly inserted into the insertion hole 111 of the top cover 110.

Further, the spring cover 120 has a locking projection 121 protruding from the bottom periphery thereof so that the locking projection 121 is locked onto the inner peripheral surface of the top cover 110, without any escape therefrom, when the spring cover 120 is inserted into the insertion hole 111 of the top cover 110.

Further, the spring cover 120 has a plurality of through holes 122 formed on the outer peripheral surface thereof to quickly transfer the high temperature heat caused by the fire occurrence to the shape memory alloy spring 140.

In this case, the through holes 122 are desirably formed on the entire outer peripheral surface of the spring cover 120.

The spring cover 120 is made of a metal.

When the self-powered fixed temperature type fire detector 10 is registered onto the receiver 20, as shown in FIG. 11a, the spring cover 120 moves in the top cover 110 and is entirely pushed, and otherwise, as shown in FIG. 11b, in a state where the spring cover 120 is fixed, only the push protrusion 130 is pressed.

In the case of the fixed type spring cover 120, as shown in FIG. 11b, when the self-powered fixed temperature type fire detector 10 is registered onto the receiver 20, the spring cover 120 has a hole 123 formed on top thereof, and a jig (not shown) is put into the hole 123 to press the push protrusion 130, thereby performing the registration.

The push protrusion 130 is inserted into the spring cover 120 and comes into contact with the dust and water-resistant self-powered operating part 200 so that it is pressed through the extension or compression of the shape memory alloy spring 140 to thus operate the dust and water-resistant self-powered operating part 200.

The end portion of the push protrusion 130 comes into contact with the dust and water-resistant self-powered operating part 200 and tapers inward.

Further, the push protrusion 130 has a support piece 131 protruding outward from the middle periphery thereof to support the shape memory alloy spring 140 and the return spring 150, independently of each other.

That is, the shape memory alloy spring 140 and the return spring 150 are separatedly supported by means of the support piece 131, so that after the push protrusion 130 moves according to the extension and compression of the shape memory alloy spring 140, it is returned to its original state by means of the extension of the return spring 150.

Further, as shown in FIG. 13, the spring cover 120 and the push protrusion 130 may be changed in length according to installation environments and conditions.

The shape memory alloy spring 140 is disposed inside the spring cover 120, extended and compressed by means of the high temperature heat generated upon fire occurrence or ambient temperature increase, and presses the push protrusion 130 to operate the dust and water-resistant self-powered operating part 200.

Further, the shape memory alloy spring 140 may be formed of an extension spring, a compression spring, or a wire so that it can be extended or compressed according to the installation position inside the spring cover 120 so as to press the push protrusion 130.

That is, as shown in FIG. 12a, in the case where the shape memory alloy spring 140 is the extension spring, if the ambient temperature is above the pre-determined temperature due to the fire occurrence or ambient temperature increase, the shape memory alloy spring 140 is extended to press the push protrusion 130, and if the ambient temperature becomes under the pre-determined temperature, the shape memory alloy spring 140 is returned to its original position and simultaneously pushes the return spring 150 to allow the push protrusion 130 to be returned to its original position.

Further, as shown in FIG. 12b, in the case where the shape memory alloy spring 140 is the compression spring, if the ambient temperature is above the pre-determined temperature due to the fire occurrence or ambient temperature increase, the shape memory alloy spring 140 is compressed to push the return spring 150 to allow the push protrusion 130 to be pressed, and if the ambient temperature becomes under the pre-determined temperature, the shape memory alloy spring 140 is returned to its original size to cause the push protrusion 130 to be returned to its original position.

Moreover, as shown in FIG. 12c, in the case where the shape memory alloy spring 140 moves with small displacement and is formed of a ring-shaped wire having wave displacement, if the ambient temperature is above the pre-determined temperature, the shape memory alloy spring 140 is waved to cause given displacement so that the push protrusion 130 is pressed and the return spring 150 supports the push protrusion 130. Next, if the ambient temperature becomes under the pre-determined temperature, the shape memory alloy spring 140 is returned to its original position.

The return spring 150 is disposed inside the spring cover 120, and if the increasing temperature is decreased after fire extinguishment, the shape memory alloy spring 140 is automatically returned to its original position so that the return spring 150 is extended to allow the push protrusion 130 to be returned to its original position.

Further, the detecting part 100 detects the fire occurrence by means of the adoption of the shape memory alloy spring 140, so that it can be recycled to thus achieve cost saving.

The dust and water-resistant self-powered operating part 200 operates cooperatively with the detecting part 100 so that upon fire occurrence, it operates by the operation of the detecting part 100 and transmits a signal to the receiver 20.

Further, the dust and water-resistant self-powered operating part 200 can be self-powered by the operation of the detecting part 100.

As shown in FIG. 4 and FIGS. 8 to 10, the dust and water-resistant self-powered operating part 200 includes a base 210, a self power generation module 220, a transmitting module 230, a dust and water-resistant member 240, and a middle cover 250.

The base 210 has partition walls 212 adapted to form an accommodation portion 211 in which the self power generation module 220 and the transmitting module 230 are disposed.

The partition walls 212 have concave surfaces 212a formed on the top end surfaces thereof.

Further, the base 210 has a plurality of fixing hooks 213 protruding upward from the bottom of the accommodation portion 211 so that the plurality of fixing hooks 213 serves to fix a rubber guide 214 for fixing the self power generation module 220 and the transmitting module 230 to top of the accommodation portion 211 thereto.

Further, the rubber guide 214 is disposed on tops of the self power generation module 220 and the transmitting module 230 disposed on the accommodation portion 211 to support the self power generation module 220 and the transmitting module 230.

The self power generation module 220 is disposed in the accommodation portion 211 to convert mechanical displacement into power according to the operation of the push protrusion 130 of the detecting part 100, thereby making it possible to perform self power generation.

Further, the self power generation module 220 operates by producing electricity from a magnetic force, and since such a method for producing electricity is widely used, explanations of a technical configuration and operating principle of the self power generation module 220 will be avoided for the brevity of the description.

The transmitting module 230 is disposed on top of the self power generation module 220 and electrically connected to the self power generation module 220 so that it receives the output generated from the self power generation module 220 and transmits a wireless signal to the receiver 20.

The dust and water-resistant member 240 is seated onto tops of the partition walls 212 of the base 210 to seal the accommodation portion 211.

Further, the dust and water-resistant member 240 is made of a rubber material.

That is, the dust and water-resistant member 240 serves to seal the entire accommodation portion 211 to prevent dust or water from entering the accommodation portion 211 so that the self power generation module 220 and the transmitting module 230 disposed in the accommodation portion 211 can be prevented from being malfunctioned due to corrosion and the like.

The dust and water-resistant member 240 has seating portions 241 formed on the outer surfaces of the lower ends thereof so that it can be seated onto the partition walls 212.

Further, the seating portions 241 have convex surfaces 241a formed on the undersides thereof and brought into close contact with the concave surfaces 212a formed on tops of the partition walls 212 so that when the dust and water-resistant member 240 is fitted to the partition walls 212, the sealing efficiency of the accommodation portion 211 can be optimized.

When the seating portion 241 is seated onto tops of the partition walls 212, that is, the dust and water-resistant member 240 firmly seals the interior of the accommodation portion 211 by means of the concave surfaces 212a and the convex surfaces 241a, thereby maximizing the sealing efficiency of the accommodation portion 211.

Further, the dust and water-resistant member 240 has a contact portion 242 formed at the central portion thereof, with which the push protrusion 130 comes into contact, so that through the operation of the push protrusion 130, the self power generation module 220 operates.

The contact portion 242 is corrugatedly formed, and when the push protrusion 130 is pressed, accordingly, only the contact portion 242 is pressed to minimize the change in air pressure, without any deformation of the entire dust and water-resistant member 240. As a result, the self power generation module 220 can operate gently, and the contact portion 242 can be quickly returned to its original state.

Further, the contact portion 242 protrudes outward from top and underside thereof and has the underside with a thickness higher than other portions thereof, so that the contact portion 242 pressurized downward by the pressed push protrusion 130 can be returned gently to its original state and the abrasion of the dust and water-resistant member 240 can be minimized even under the repeated operations of the push protrusion 130 over a long period of time.

The middle cover 250 surrounds the outer periphery of the base 210 and is connected to the top cover 110 of the detecting part 100 by means of the bolts B.

Further, the middle cover 250 has a fitting hole 251 formed at the central portion thereof to fit the push protrusion 130 thereto.

The receiver 20 receives a fire occurrence signal from the transmitting module 230 through wireless communication according to the operation of the self-powered fixed temperature type fire detector 10 and thus monitors the fire occurrence signal.

That is, the receiver 20 receives the detected signal of the self-powered fixed temperature type fire detector 10 as an RF signal and transmits the RF signal to the application part 30.

If the self-powered fixed temperature type fire detector 10 operates, further, the receiver 20 displays a position number of a fire occurrence region on a monitor and transmits the signal to the application part 30 through a communication module (for example, 485 communication or RF communication relay module).

Through the application part 30, the fire occurrence signal received from the receiver 20 is notified in real time.

Further, the application part 30 receives the signal from the receiver 20 to allow fire occurrence to be notified by means of a speaker or warning lamp and is connected to servers through which the registered signal is checked to handle the fire situation as soon as possible.

Under the above-mentioned configuration, an explanation of operations of the system for wirelessly transmitting and receiving self-powered power-free fixed temperature type fire detection according to the present invention will be given below.

The dust and water-resistant self-powered operating part 200 operates cooperatively with the detecting part 100, and accordingly, the detecting part 100 operates by means of the fire occurrence or ambient temperature increase to operate the dust and water-resistant self-powered operating part 200. If the dust and water-resistant self-powered operating part 200 operates, it transmits the signal to the receiver 20 through wireless communication to allow the fire occurrence to be quickly notified to the receiver 20 and the application part 30.

If the ambient temperature is above the pre-determined temperature due to fire occurrence or ambient temperature increase, the shape memory alloy spring 140 to which the pre-determined temperature is set generates shape memory displacement so that it is extended or compressed to press the push protrusion 130 downward. Accordingly, the self power generation module 220 operates to perform self power generation, and through the generated electricity, the transmitting module 230 notifies the receiver 20 of the fire occurrence or ambient temperature increase.

If the ambient temperature becomes under the pre-determined temperature because of fire extinguishment, the shape memory alloy spring 140 is returned to its original position before the displacement, and the return spring 150 supporting the push protrusion 130 presses the push protrusion 130, so that a second signal for representing the fire extinguishment is transmitted to keep a fire detection state again.

As the detecting part 100 operates, further, the dust and water-resistant self-powered operating part 200 operates through the detection and mechanical changes of the detecting part 100, and in this case, if the push protrusion 130 is pressed, the self power generation module 220 generates electricity momentarily and supplies the electricity to the transmitting module 230. As a result, the transmitting module 230 quickly transmits the RF signal to the receiver 20.

Accordingly, the detecting part 100 of the self-powered fixed temperature type fire detector 10 detects the fire occurrence and increasing temperature changes through the shape memory alloy spring 140, so that it cannot be limited in the use thereof.

Further, the self power generation module 220 of the dust and water-resistant self-powered operating part 200 operating under the operation of the detecting part 100 performs the self power generation, so that it can be used semi-permanently, without any charge or battery exchange.

In a state where the self power generation module 220 and the transmitting module 230 are mounted in the accommodation portion 211, moreover, the rubber guide 214, which is disposed on tops of the self power generation module 220 and the transmitting module 230, is fixed to the fixing hooks 213, thereby firmly fixing the self power generation module 220 and the transmitting module 230 disposed in the accommodation portion 211 thereto, without any movements therein, supporting the contact portion 242 of the dust and water-resistant member 240 for sealing the accommodation portion 211 to minimize the movement and deformation of the dust and water-resistant member 240, and preventing an air pressure from being generated from the interior of the dust and water-resistant member 240.

Further, the dust and water-resistant member 240 is seated onto tops of the partition walls 212 defining the accommodation portion 211 in which the self power generation module 220 and the transmitting module 230 are disposed to firmly seal the accommodation portion 211, thereby preventing external dust or water from entering the accommodation portion 211 to protect the self power generation module 220 and the transmitting module 230 from malfunctions.

Additionally, when the dust and water-resistant member 240 is seated onto tops of the partition walls 212, the convex surfaces 241a of the seating portions 241 come into contact with the concave surfaces 212a of the partition walls 212, thereby maximizing the sealing efficiency of the accommodation portion 211.

Further, the contact portion 242 of the dust and water-resistant member 240 is corrugatedly formed, and when the push protrusion 130 pushes the contact portion 242, accordingly, only the contact portion 242 is deformed, while the entire region of the dust and water-resistant member 240 is being not deformed, so that even though the air in the accommodation portion 211 is expanded, the space for the expanded air is ensured by the corrugated contact portion 242 to cause no limitations in the press operation of the push protrusion 130, thereby ensuring gentle operations of the push protrusion 130, even though the push protrusion 130 operates a plurality of times, to thus provide high durability and wear resistance.

Accordingly, the accommodation portion 211 in which the self power generation module 220 and the transmitting module 230 are disposed is firmly sealed by the dust and water-resistant member 240 made of the rubber material to prevent dust or water from being introduced thereinto, thereby maximizing the performance of the product, and the contact portion 242 of the dust and water-resistant member 240 is corrugatedly formed, so that when the push protrusion 130 is pressed, only the contact portion 242 is deformed, while the entire region of the dust and water-resistant member 240 is being not deformed, thereby minimizing the change in air pressure to ensure the gentle press operations of the push protrusion 130 and allowing the self power generation module 220 to operate gently.

Further, the interior of the dust and water-resistant self-powered operating part 200 can be protected from dust and water to the maximum extent possible, and accordingly, the self-powered fixed temperature type fire detector 10 is mounted freely, irrespective of the inside and outside of a building, thereby maximizing the product efficiency.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. It is therefore intended that the scope of the invention be limited not by this detailed description, but rather by the claims appended hereto.

The invention claimed is:

1. A system for wirelessly transmitting and receiving self-powered power-free fixed temperature type fire detection, the system comprising:
   a self-powered fixed temperature type fire detector operating by a heat generated by fire occurrence and self-powered;

a receiver for receiving and monitoring a fire occurrence signal through wireless communication according to an operation of the self-powered fixed temperature type fire detector; and
an application part for allowing the fire occurrence signal received from the receiver to be notified in real time,
wherein the self-powered fixed temperature type fire detector comprises:
a detecting part for detecting, if a temperature caused by the fire occurrence is above a pre-determined temperature, the temperature to thus operate; and
a dust and water-resistant self-powered operating part operating cooperatively with the operation of the detecting part to transmit a fire occurrence signal to the receiver,
the detecting part comprising:
a top cover connected to the dust and water-resistant self-powered operating part;
a spring cover connected to the top cover;
a push protrusion inserted into the spring cover, coming into contact with the dust and water-resistant self-powered operating part, and operating the dust and water-resistant self-powered operating part;
a shape memory alloy spring disposed inside the spring cover, extended and compressed through shape memory displacement by a high temperature heat generated by the fire occurrence, and pressing the push protrusion serving as a switch to operate the dust and water-resistant self-powered operating part; and
a return spring disposed inside the spring cover to return the push protrusion to an original state thereof under a situation where the shape memory alloy spring is automatically returned to the original state thereof if the temperature is returned to a normal temperature after fire extinguishment,
the dust and water-resistant self-powered operating part comprising:
a base having partition walls adapted to form an accommodation portion thereon;
a self power generation module disposed inside the accommodation portion and performing self power generation;
a transmitting module electrically connected to top of the self power generation module, receiving the output generated from the self power generation module, and transmitting a radio signal to the receiver;
a dust and water-resistant member disposed on tops of the partition walls of the base to seal the accommodation portion; and
a middle cover surrounding outer surfaces of the base and fixedly connected to the detecting part by means of bolts,
the dust and water-resistant member comprising seating portions formed on the outer surfaces of lower ends thereof to be seated onto the partition walls and a contact portion formed at a central portion thereof to be pressurized by a press operation of the push protrusion to allow the self power generation module to perform the self power generation,
the contact portion being corrugatedly formed so that when the push protrusion is pressed, the contact portion is pressurized to minimize a change in air pressure, to operate the self power generation module gently, and to be returned quickly to the original state thereof, and
a method for registering the self-powered fixed temperature type fire detector onto the receiver is carried out by means of pressurization of an entire surface of the spring cover through which the spring cover having given flexibility is pressurized to press the push protrusion so that the dust and water-resistant self-powered operating part operates, or by means of the pressurization of the push protrusion, without any movement of the spring cover.

2. The system according to claim 1, wherein the top cover comprises an insertion hole formed at the central portion thereof to insert the spring cover and the push protrusion thereinto and a plurality of connection pins disposed on an underside thereof to fasten the bolts thereto so that the detecting part is fixed to the dust and water-resistant self-powered operating part by means of the bolts.

3. The system according to claim 1, wherein the push protrusion is configured to allow an end thereof to come into contact with the dust and water-resistant self-powered operating part and comprises a support piece protruding outward from a middle periphery thereof to support the shape memory alloy spring and a return spring, independently of each other.

4. The system according to claim 1, wherein the spring cover comprises a locking projection protruding from a bottom periphery thereof to be locked onto an inner peripheral surface of the top cover, without any escape therefrom, when the spring cover is inserted into the insertion hole of the top cover, and a plurality of through holes formed on an outer peripheral surface thereof to quickly transfer the high temperature heat caused by the fire occurrence to the shape memory alloy spring.

5. The system according to claim 1, wherein in a case where the shape memory alloy spring is formed of an extension spring, if ambient temperature is above a pre-determined temperature set to the shape memory alloy spring, the shape memory alloy spring is extended to press the push protrusion, and if the ambient temperature becomes under the pre-determined temperature, the shape memory alloy spring is returned to the original state thereof to pressurize the return spring so that the push protrusion is returned to the original position thereof, in the case where the shape memory alloy spring is formed of a compression spring, if ambient temperature is above the pre-determined temperature, the shape memory alloy spring is compressed to pressurize the return spring to allow the push protrusion to be pressed, and if the ambient temperature becomes under the pre-determined temperature, the shape memory alloy spring is returned to the original size thereof to cause the push protrusion to be returned to the original position thereof, and in the case where the shape memory alloy spring is formed of a ring-shaped wire having wave displacement, which is used in small displacement, if ambient temperature is above the pre-determined temperature, the shape memory alloy spring is waved to cause given displacement so that the push protrusion is pressed and the return spring supports the push protrusion, and if the ambient temperature becomes under the pre-determined temperature, the shape memory alloy spring is returned to the original position thereof.

6. The system according to claim 1, wherein the receiver receives the operating signal of the self-powered fixed temperature type fire detector, displays a fire occurrence position number on a monitor, and transmits the fire occurrence signal to the application part through a communication module.

7. The system according to claim 1, wherein the application part receives the fire occurrence signal from the receiver to allow a fire occurrence situation to be notified and controlled through a speaker, a warning lamp, and a server.

\* \* \* \* \*